US 10,681,094 B2

(12) United States Patent
Miyamoto et al.

(10) Patent No.: US 10,681,094 B2
(45) Date of Patent: Jun. 9, 2020

(54) CONTROL SYSTEM, COMMUNICATION CONTROL METHOD, AND PROGRAM PRODUCT

(71) Applicants: Atsushi Miyamoto, Kanagawa (JP); Naoki Umehara, Kanagawa (JP); Hiroshi Hinohara, Kanagawa (JP); Takeshi Horiuchi, Tokyo (JP); Takuya Soneda, Kanagawa (JP)

(72) Inventors: Atsushi Miyamoto, Kanagawa (JP); Naoki Umehara, Kanagawa (JP); Hiroshi Hinohara, Kanagawa (JP); Takeshi Horiuchi, Tokyo (JP); Takuya Soneda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 159 days.

(21) Appl. No.: 15/995,300

(22) Filed: Jun. 1, 2018

(65) Prior Publication Data
US 2018/0288112 A1 Oct. 4, 2018

Related U.S. Application Data

(63) Continuation of application No. PCT/JP2016/085550, filed on Nov. 30, 2016.

(30) Foreign Application Priority Data

Dec. 4, 2015 (JP) ................... 2015-237382

(51) Int. Cl.
*G06F 15/16* (2006.01)
*H04L 29/06* (2006.01)
(Continued)

(52) U.S. Cl.
CPC ............ *H04L 65/403* (2013.01); *G06F 13/00* (2013.01); *H04N 21/25816* (2013.01);
(Continued)

(58) Field of Classification Search
CPC . H04L 65/403; G06F 13/00; H04N 21/25816; H04N 21/25875; H04N 21/42684; H04N 21/632
(Continued)

(56) References Cited

U.S. PATENT DOCUMENTS 8,392,961 B2 * 3/2013 Bhola ................. G06F 21/6218
370/342
9,749,392 B2 * 8/2017 O'Shaughnessy ...... H04L 67/06
(Continued)

FOREIGN PATENT DOCUMENTS

| JP | 2008-124977 | 5/2008 |
|---|---|---|
| JP | 2009-519509 | 5/2009 |

(Continued)

OTHER PUBLICATIONS

Espacenet machine translation of JP 2009-152995A. Original publication date of 2009. Translated date of 2020. pp. 1-10. (Year: 2009).*

(Continued)

Primary Examiner — Imad Hussain
(74) Attorney, Agent, or Firm — Oblon, McClelland, Maier & Neustadt, L.L.P.

(57) ABSTRACT

A disclosed control system configured to control transmission of content data between communication terminals includes one or more processors, and a memory storing instructions that, when executed by the one or more processors, cause the control system to receive a transmission request including attribute information indicating an attribute of the content data for transmitting the content data from a first communication terminal, and perform control for transmitting the content data to a second communication terminal specified based on the destination information in response to the attribute information being in a predeter- (Continued)

mined format, the predetermined format including destination information indicating a destination of the content data and to perform control for transmitting the content data to a third communication terminal that has requested reception of the content data having the attribute indicated by the attribute information in response to the attribute information not being in the predetermined format.

11 Claims, 12 Drawing Sheets

(51) Int. Cl.
     *G06F 13/00*       (2006.01)
     *H04N 21/258*    (2011.01)
     *H04N 21/63*     (2011.01)
     *H04N 21/426*    (2011.01)

(52) U.S. Cl.
     CPC . *H04N 21/25875* (2013.01); *H04N 21/42684* (2013.01); *H04N 21/632* (2013.01)

(58) Field of Classification Search
     USPC ........................................................ 709/204
     See application file for complete search history.

(56) References Cited

U.S. PATENT DOCUMENTS

| | | | | |
|---|---|---|---|---|
| 2003/0187743 A1* | 10/2003 | Kumaran | ........... | G06Q 10/0637 705/26.1 |
| 2005/0086360 A1* | 4/2005 | Mamou | ................. | G06F 16/254 709/232 |
| 2005/0203949 A1* | 9/2005 | Cabrera | .................. | H04L 67/02 |
| 2010/0281154 A1* | 11/2010 | Bedi | .................... | G06F 11/2294 709/224 |
| 2012/0191856 A1* | 7/2012 | Chen | ..................... | G06F 9/5083 709/226 |
| 2014/0136589 A1* | 5/2014 | Wahler | ................ | H04L 67/1002 709/201 |
| 2015/0319248 A1* | 11/2015 | Wahler | .................. | G06F 21/554 709/204 |
| 2018/0225451 A1* | 8/2018 | Wahler | ................ | H04L 63/0263 |
| 2019/0052657 A1* | 2/2019 | Nadkarni | ................ | G06F 21/56 |

FOREIGN PATENT DOCUMENTS

| | | |
|---|---|---|
| JP | 2009-152995 | 7/2009 |
| JP | 2012-199612 | 10/2012 |
| JP | 5160134 | 3/2013 |

OTHER PUBLICATIONS

Extended European Search Report dated Nov. 22, 2018 in corresponding European Patent Application No. 16870711.5, 7 pages.
International Search Report dated Dec. 27, 2016 in PCT/JP2016/085550 filed on Nov. 30, 2016(with English Translation).
Written Opinion dated Dec. 27, 2016 in PCT/JP2016/085550 filed on Nov. 30, 2016.

* cited by examiner

FIG.6A

| USER ID | USER NAME | PASSWORD |
|---|---|---|
| U01 | a | abc |
| U02 | b | def |
| U03 | c | ghi |
| ... | ... | ... |

FIG.6B

| CLIENT ID | CLIENT NAME | PASSWORD |
|---|---|---|
| C01 | CHAT APPLICATION | aaaa |
| C02 | LOG APPLICATION | bbbb |
| C03 | LOG MANAGEMENT APPLICATION | cccc |
| C04 | MONITORING CAMERA APPLICATION | dddd |
| C05 | MONITORING CENTER APPLICATION | dddd |
| ... | ... | ... |

FIG.6C

| SERVICE ID | SERVICE NAME |
|---|---|
| S01 | TRANSMISSION MANAGEMENT SYSTEM |
| S02 | PHOTO MANAGEMENT SYSTEM |
| ... | ... |

FIG.6D

| CLIENT ID | SERVICE ID |
|---|---|
| C01 | S01 |
| C02 | S01 |
| C03 | S01 |
| C04 | S01 |
| C05 | S01 |
| ... | ... |

FIG.7A

| TOPIC ID | TOPIC NAME |
|---|---|
| T01 | device_log |
| T02 | bulletin_board |
| T03 | message/b/a |
| T04 | message/a/b |
| T05 | surveillance/mart |
| ... | ... |

FIG.7B

| USER NAME | TOPIC ID |
|---|---|
| a | – |
| b | – |
| c | T02 |
| ... | ... |

_US 10,681,094 B2_

CONTROL SYSTEM, COMMUNICATION CONTROL METHOD, AND PROGRAM PRODUCT

CROSS-REFERENCE TO RELATED APPLICATIONS

The present application is a continuation application of International Application No. PCT/JP2016/085550, filed Nov. 30, 2016, which claims priority to Japanese Patent Application No. 2015-237382, filed Dec. 4, 2015. The contents of these applications are incorporated herein by reference in their entirety.

BACKGROUND OF THE INVENTION

1. Field of the Invention

The disclosure herein generally relates to a control system, a communication control method, and a program product.

2. Description of the Related Art

Communication systems for making phone calls, conducting conferences, and the like via communication networks such as the Internet and dedicated lines have become widespread along with demands for reduction in traveling expenses and time of parties concerned. In such communication systems, when communication is started between communication terminals, content data such as image data and sound data are transmitted and received to achieve communication between the parties. In addition, as a method for transmitting content data between communication terminals, a publish-subscribe model (hereinafter referred to as pub-sub model) is known in the art.

For example, Patent Document 1 discloses a method for providing access control in either content-based publish system or subscribe system for delivering messages from an issuing side client to a subscribing side client via multiple routing broker machines.

SUMMARY OF THE INVENTION

According to an aspect of the disclosure, a control system configured to control transmission of content data between communication terminals is provided. The control system includes
one or more processors; and
a memory storing instructions that, when executed by the one or more processors, cause the control system to:
receive a transmission request including attribute information indicating an attribute of the content data for transmitting the content data from a first communication terminal; and
perform control for transmitting the content data to a second communication terminal specified based on the destination information in response to the attribute information being in a predetermined format, the predetermined format including destination information indicating a destination of the content data, and perform control for transmitting the content data to a third communication terminal that has requested reception of the content data having the attribute indicated by the attribute information in response to the attribute information not being in the predetermined format.

RELATED ART DOCUMENT

Patent Document

[Patent Document 1] Japanese Patent No. 5160134

BRIEF DESCRIPTION OF THE DRAWINGS

Other objects and further features of embodiments will be apparent from the following detailed description when read in conjunction with the accompanying drawings, in which:

FIG. 6A is a schematic diagram depicting a user management table managed by the authentication server;

FIG. 6B is a schematic diagram depicting a client management table managed by the authentication server;

FIG. 6C is a schematic diagram depicting a service management table managed by the authentication server;

FIG. 6D is a schematic diagram depicting a service authorization management table managed by the authentication server;

FIG. 7A is a schematic diagram depicting a topic management table managed by the management system;

FIG. 7B is a schematic diagram depicting a session management table managed by the management system;

DESCRIPTION OF THE EMBODIMENTS

In the pub-sub model, for example, even if a publication request for a message directed to a specific destination is made with respect to a topic, an account that does not correspond to the specific destination will have access to the content data by making a subscription request with respect to this topic. Thus, in the pub-sub model communication system, sufficient security may fail to be obtained in a case of processing content data with respect to a specific destination.

In the following, embodiments of the present invention will be described with reference to the drawings.

Outline of Communication System

Figure 1:
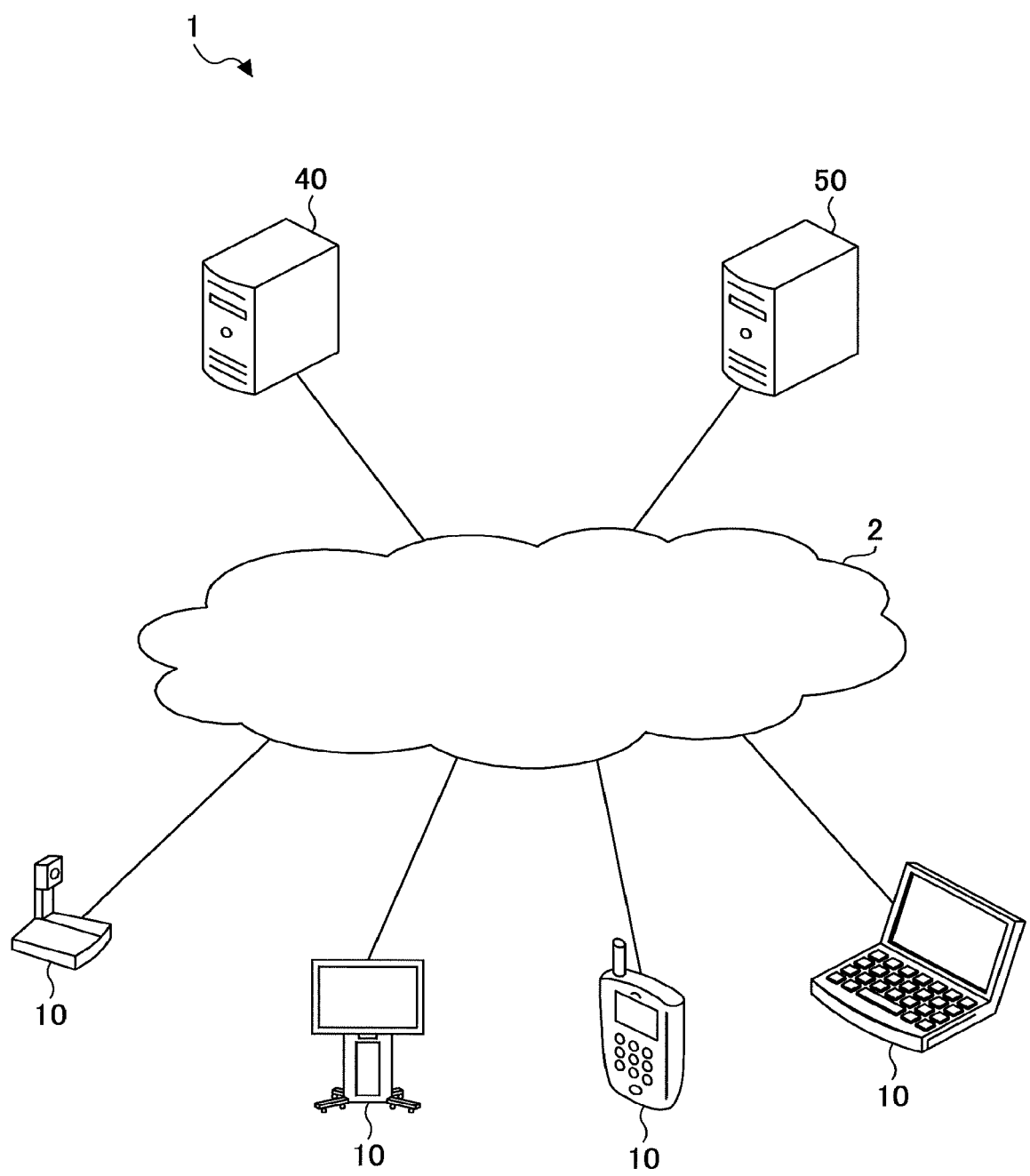
FIG. 1 is a schematic diagram of a communication system according to an embodiment of the present invention.

FIG. 1 is a schematic diagram of a communication system according to an embodiment of the present invention. As illustrated in FIG. 1, a communication system 1 includes a communication terminal 10, an authentication server 40, and a management system 50. Hereinafter, the communication terminal 10 will simply be referred to as a terminal 10.

In the publish-subscribe (hereinafter referred to as "pub-sub") model, the management system 50 is configured to receive, from a client, a request for publication of a message (publish, hereinafter referred to as "pub" where appropriate) and a request for subscription of a message (subscribe, hereinafter referred to as "sub" where appropriate) in order to exchange messages between clients. Note that a request for publishing (or a pub request) a message (data) is an example of a request for transmitting a message (data), and a request for subscribing (or a sub request) a message (data) is an example of a request for receiving a message (data). The management system 50 may implement MQTT (MQ Telemetry Transport), pub-sub extension (XEP-0060) of XMPP (Extensible Messaging and Presence Protocol), and the like, as a protocol corresponding to the pub-sub model (pub-sub pattern).

Each terminal 10 is, for example, a general-purpose terminal, on which desired client applications are installed. Hereinafter, the client application may also be referred to as a "client app". Each terminal 10 is, for example, a dedicated terminal, which incorporates a specific client application that operates as a client. Since the terminal 10 is communicably connected to the management system 50 via a communication network 2, each client may be enabled to request the management system 50 to perform publication (pub) or subscription (sub) of a message. The terminal 10 may, for example, be a television conference terminal, an electronic whiteboard, an electronic signage, a telephone, a tablet, a smartphone, a camera, a PC (personal computer), or the like.

The authentication server 40 is configured to authenticate a "client" which is a client app operating on the terminal 10 and a "user" who uses the client to authorize the use of or access to the management system 50. The management system 50 implements authentication and authorization protocols such as OAuth 2.0 and OpenID connect so as to achieve the above authentication and authorization.

The communication system 1 according to the embodiment described in FIG. 1 indicates a configuration where each of the management system 50 and the authentication server 40 is composed of a single apparatus for simplifying description; however, the present invention is not limited to such an embodiment. At least one of the management system 50 and the authentication server 40 may be composed of multiple apparatuses. Further, the management system 50 and the authentication server 40 may be composed of one system or one apparatus. In FIG. 1, an embodiment illustrates the communication system 1 that includes four terminals 10 as an example for simplifying illustration; however, the present invention is not limited to such an embodiment. The number of terminals 10 provided in the communication system 1 may be two, three, five or more. In addition, each terminal 10 may be of the same type or may be of different type as illustrated in FIG. 1.

Hardware Configuration

Next, hardware configurations of devices forming the communication system 1 will be described.

Figure 2:
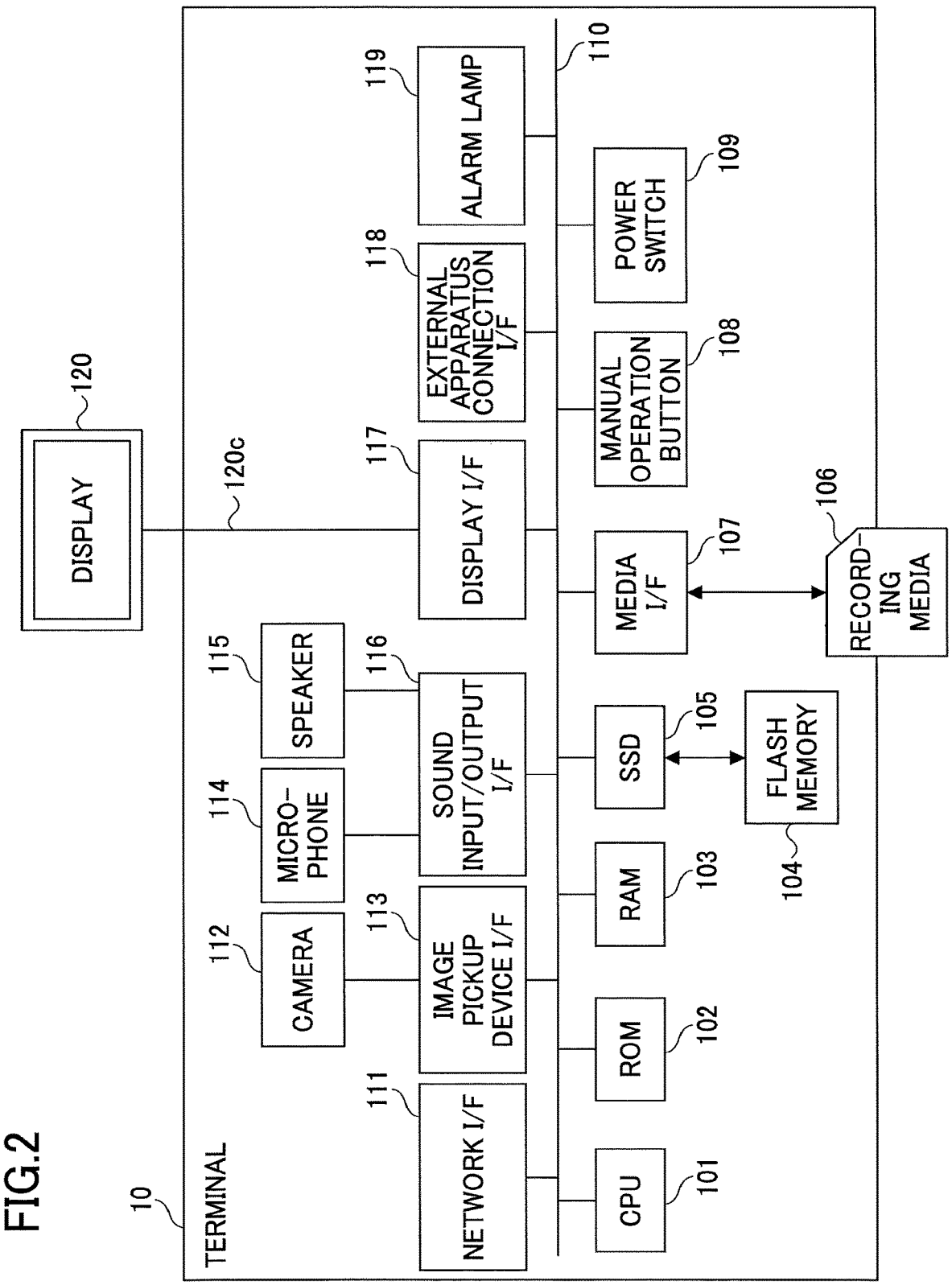
FIG. 2 is a block diagram depicting a hardware configuration of a terminal according to an embodiment.

FIG. 2 is a block diagram depicting a hardware configuration of a terminal according to an embodiment. Note that the hardware configuration of the terminal 10 is not limited to the configuration illustrated in FIG. 2 insofar as the terminal 10 is designed to perform communication. For example, the terminal 10 may include a configuration not described in FIG. 2, or the terminal 10 may exclude a part of the configuration described in FIG. 2. In addition, a part of the configuration illustrated in FIG. 2 may be an external apparatus or the like connectable to the terminal 10. As illustrated in FIG. 2, the terminal 10 of the embodiment includes a central processing unit (CPU) 101 configured to control overall operations of the terminal 10, a read only memory (ROM) 102 configured to store a program used for driving the CPU 101 such as an initial program loader (IPL), a random access memory (RAM) 103 used as a work area of the CPU 101, a flash memory 104 configured to store programs for various terminals of the terminal 10 and various data such as image data and audio data, a solid-state state drive (SSD) 105 configured to control reading or writing of various data such as image data and sound data with respect to the flash memory 104 under the control of the CPU 101, a media I/F 107 configured to control reading or writing (storing) of data with respect to a recording medium 106 such as a flash memory or an IC card (Integrated Circuit Card), an operation button 108 operated in the case of selecting a destination, a power switch 109 configured to switch on/off the power supply of the terminal 10, and a network I/F (Interface) 111 configured to perform data transmission using the communication network 2.

The terminal 10 further includes a built-in camera 112 configured to capture an image of a subject to acquire image data under the control of the CPU 101, an image pickup element I/F 113 configured to control the driving of the camera 112, a built-in microphone 114 configured to input voice or sound, a built-in speaker 115 configured to output voice or sound, a sound input/output I/F 116 configured to process input and output of sound signals between the microphone 114 and the speaker 115 under the control of the CPU 101, a display I/F 117 configured to transmit image data to an external display 120 under the control of the CPU 101, an external apparatus connection I/F 118 configured to connect various external apparatuses, an alarm lamp 119 configured to indicate abnormality of various functions of the terminal 10, and a bus line 110 such as an address bus and a data bus for electrically connecting the above-described constituent elements as illustrated in FIG. 2.

The display 120 is a display unit composed of a liquid crystal or an organic electroluminescence (organic EL) configured to display an image of a subject, an operation, and the like. Further, the display 120 is connected to the display I/F 117 via a cable 120c. The cable 120c may be an analog RGB (VGA) signal cable, a component video cable, a high-definition multimedia interface (HDMI) (registered trademark) cable, or a digital video interactive signal (DVI) cable.

The camera 112 includes lenses and a solid-state image sensor configured to convert an image (video) of a subject into electronic data by converting light into electric charges. Examples of the solid-state image sensor include a CMOS (complementary metal oxide semiconductor) or a CCD (charge coupled device).

External apparatuses such as an external camera, an external microphone, and an external speaker may electrically be connected to the external apparatus connection I/F 118 via a USB (universal serial bus) cable or the like inserted in a connection port 1132 of a case 1100. Upon an external camera being connected to the external apparatus connection I/F 118, the external camera is driven in preference to the built-in camera 112 in accordance with the control of the CPU 101. Similarly, upon the external microphone or the external speaker being connected to the external apparatus connection I/F 118, the external microphone or the external speaker connected to the external apparatus connection I/F 118 is driven in preference to the built-in microphone 114 or the built-in speaker 115 in accordance with the control of the CPU 101.

The recording medium 106 is detachably attached to the terminal 10. Further, insofar as a nonvolatile memory is configured to read or write data in accordance with the control of the CPU 101, such a nonvolatile memory is not limited to the flash memory 104, and may be an EEPROM (Electrically Erasable and Programmable ROM), or the like.

Figure 3:
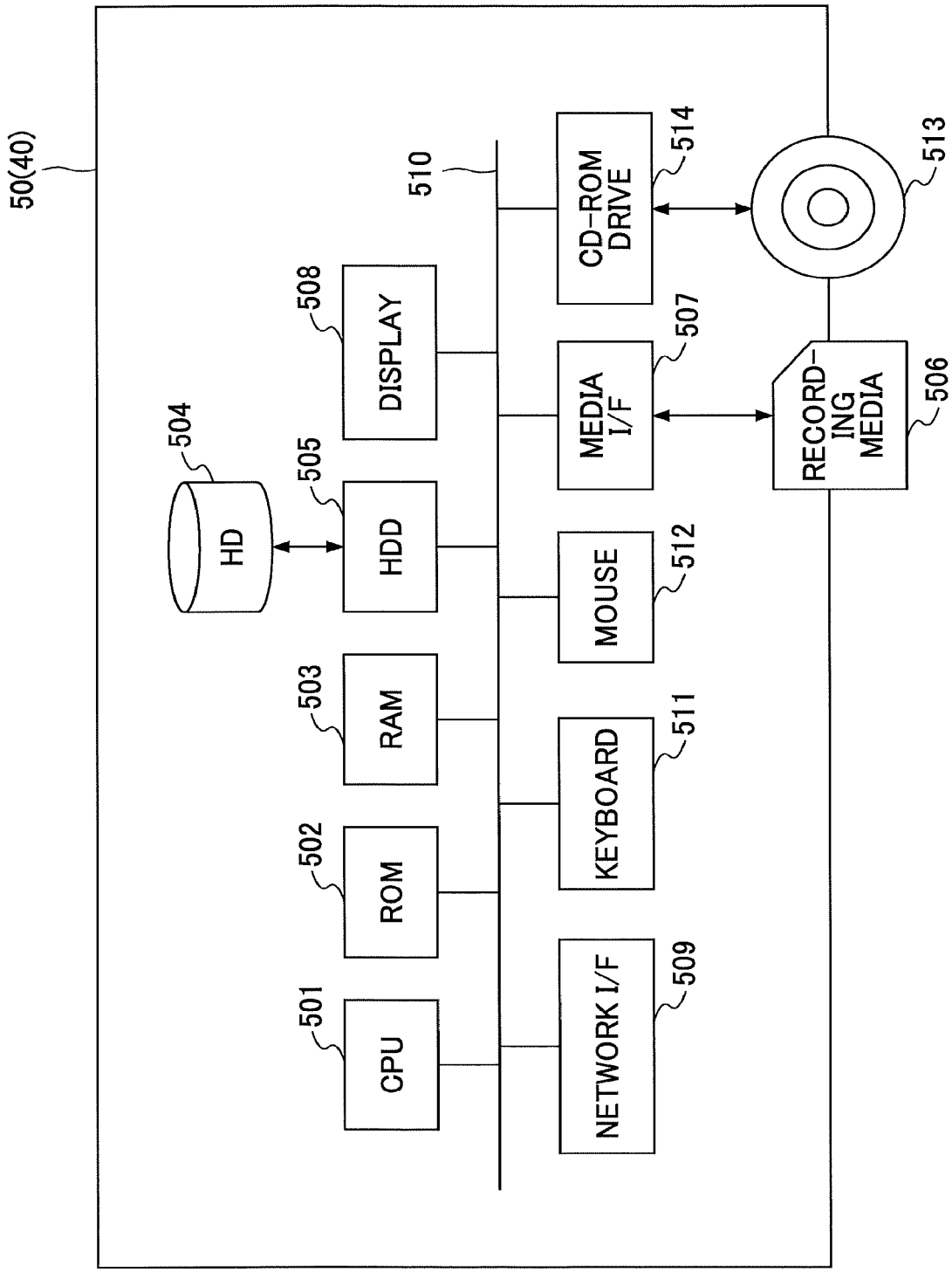
FIG. 3 is a block diagram depicting a hardware configuration of a management system according to an embodiment.

FIG. 3 is a block diagram depicting a hardware configuration of a management system 50 according to an embodiment. The management system 50 includes a CPU 501 configured to control overall operations of the entire management system 50, a ROM 502 configured to store a program used for driving the CPU 501 such as IPL, a RAM 503 used as a work area of the CPU 501, an HD 504 configured to store various data such as a program for the management system 50, a hard disk drive (HDD) 505 configured to control reading or writing of various data with respect to the HD 504 under the control of the CPU 501, a media drive 507 configured to control reading or writing (storing) of data with respect to the recording medium 506 such as a flash memory, a display 508 configured to display various information such as a cursor, a menu, a window, a character, or an image, a network I/F 509 configured to perform data communication using a communication network 2, a keyboard 511 provided with multiple keys for a user to input characters, numerical values, various instructions, a mouse 512 for a user to select and execute various instructions, to select an object to be processed, and to move a cursor, a CD-ROM drive 514 configured to control reading or writing of various data with respect to a compact disc read only memory (CD-ROM) 513 as an example of a removable recording medium, a bus line 510 such as an address bus or a data bus for electrically connecting the above-mentioned components as illustrated in FIG. 3.

The authentication server 40 has a hardware configuration similar to that of the management system 50, and hence, a duplicated illustration of the hardware configuration is omitted from the specification.

Software Configuration

Figure 4:
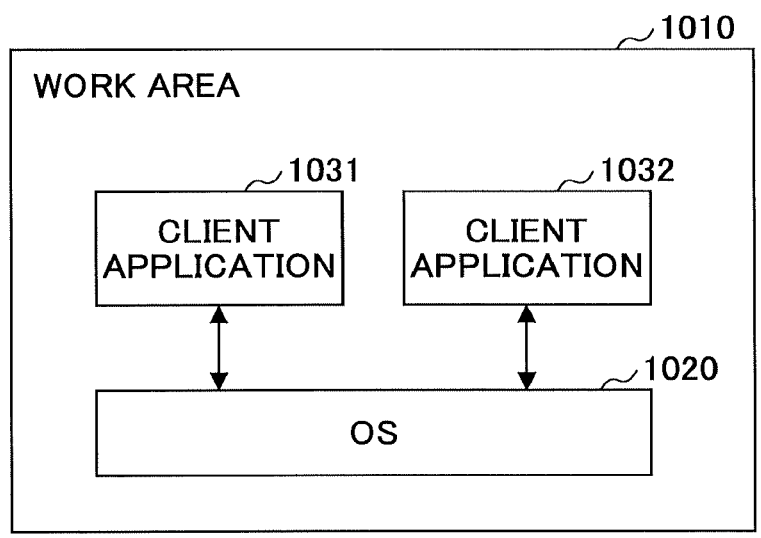
FIG. 4 is a block diagram depicting a software configuration of a terminal according to an embodiment.

FIG. 4 is a block diagram depicting a software configuration of the terminal 10 according to an embodiment. As illustrated in FIG. 4, an OS 1020 and client applications (1031 and 1032) operate in a work area 1010 of the RAM 103 of the terminal 10. The OS 1020 and client applications (1031 and 1032) are installed in the terminal 10. The OS 1020 and client applications (1031 and 1032) are installed in each of the terminals 10 constituting the communication system 1 of this embodiment.

The OS 1020 is basic software for providing basic functions to the terminal 10 so as to manage the terminal 10 in its entirety. The client applications (1031 and 1032) are apps configured to request the authentication server 40 to perform authentication and to cause the management system 50 to execute at least one of a pub request and a sub request.

According to an example in FIG. 4, at least two client applications (1031 and 1032) are installed on the terminal 10; however, any number of one or more client applications may be installed on the terminal 10. Further, any desired application may operate on the OS 1020, and a client application may operate on this desired application.

Functional Configuration

Figure 5:
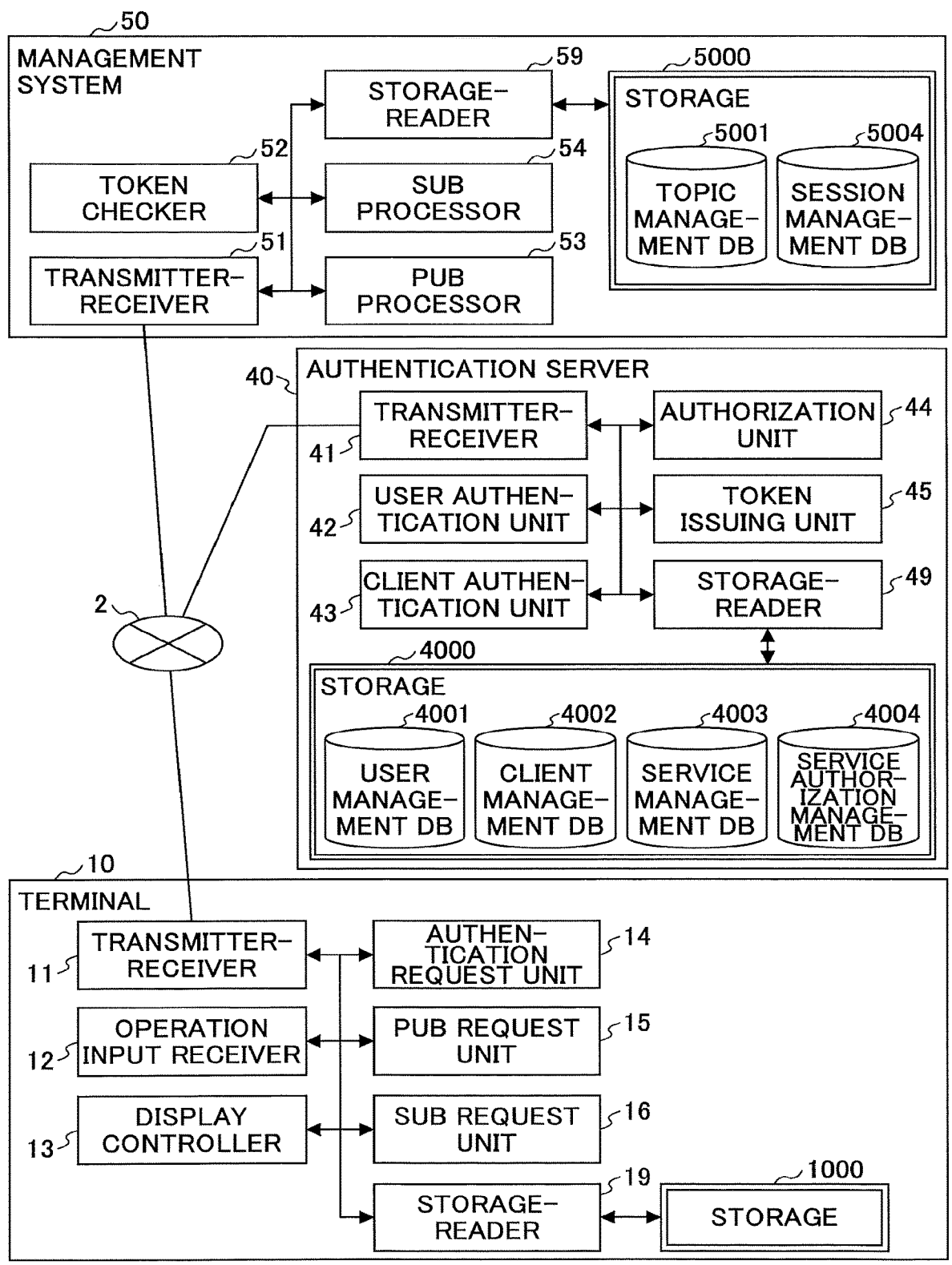
FIG. 5 is a block diagram depicting functions of a terminal, an authentication server, and a management system according to an embodiment.

Next, a description is given of functional configurations of the embodiment. FIG. 5 is a block diagram illustrating functions (components or elements) of the terminal 10, the authentication server 40, and the management system 50 constituting a part of the communication system 1 according to the embodiment. In FIG. 5, the terminal 10, the authentication server 40, and the management system 50 are connected via the communication network 2 to perform data communications with one another.

Functional Configuration of Terminal

The terminal 10 includes a transmitter-receiver 11, an operation input receiver 12, a display controller 13, an authentication request unit 14, a pub request unit 15, a sub request unit 16, and a storage-reader 19. These components are functions that may be achieved by any of the components illustrated in FIG. 2 to operate instructions from the CPU 101 in accordance with a program loaded from the flash memory 104 in the RAM 103. The terminal 10 also includes a storage 1000 composed of the ROM 102, the RAM 103, and the flash memory 104 illustrated in FIG. 2.

Each Functional Configuration of Terminal

Next, a functional configuration of the terminal 10 will be described in detail with reference to FIGS. 2 and 5. In describing the functional configuration of the terminal 10, a relationship between the components illustrated in FIG. 2 and the main components for implementing respective functional configurations of the terminal 10 will also be described.

The transmitter-receiver 11 is implemented by instructions from the CPU 101 and by the network I/F 111. The transmitter-receiver 11 is configured to transmit and receive various data (or information) with respect to a counterpart terminal, apparatuses, a system, or the like via the communication network 2.

The operation input receiver 12 is implemented by instructions from the CPU 101, the operation button 108 and the power switch 109. The operation input receiver 12 is configured to receive various inputs by a user and various types of selection made by the user.

The display controller 13 is implemented by instructions from the CPU 101 and the display I/F 117. The display controller 13 is configured to perform control for sending instructions from the CPU 101 and sending image data received from the other party during a phone call.

The authentication request unit 14 is implemented by instructions from the CPU 101 according to the client application and requests authentication from the authentication server 40. Note that when multiple client applications are installed in the terminal 10, the authentication request unit 14 is generated for each of the activated client applications installed on the terminal 10.

The pub request unit 15 is implemented by instructions from the CPU 101 according to the client application and makes a pub request for a message with respect to the management system 50. In other words, the pub request unit 15 requests the management system 50 to transmit a message. Note that when the client application supports sub but does not support pub, the pub request unit 15 is not generated in the terminal 10. Note that when multiple client applications that support pub are installed on the terminal 10, the pub request unit 15 is generated for each of the activated client applications installed on the terminal 10.

The sub request unit 16 is implemented by instructions from the CPU 101 according to the client application and makes a sub request for a message with respect to the management system 50. In other words, the sub request unit 16 makes a request for receiving a message to the management system 50. Note that when the client application supports pub but does not support sub, the sub request unit 16 is not generated in the terminal 10. Note that in a case where multiple client applications that support sub are installed on the terminal 10, the sub request unit 16 is generated for each of the activated client applications installed on the terminal 10.

The storage-reader 19 is implemented by instructions from the CPU 101 and by the SSD 105, or by instructions from the CPU 101 alone, and is configured to store various data in the storage 1000 and extract various data stored in the storage 1000.

Functional Configuration of Authentication Server

The authentication server 40 includes a transmitter-receiver 41, a user authentication unit 42, a client authentication unit 43, an authorization unit 44, a token issuing unit 45, and a storage-reader 49. These elements are functions that may be achieved by any of the above elements illustrated in FIG. 3 to operate instructions from the CPU 501 in accordance with the authentication server 40 program loaded from the HD 504 in the RAM 503. Further, the authentication server 40 has a storage 4000 composed of the HD 504.

User Management Table

FIG. 6A is a schematic diagram illustrating a user management table. In the storage 4000, a user management DB 4001 is constructed by a user management table. The user management table is configured to manage a user name and a password in association with a user ID (identifier, identification), for every user ID.

User Management Table

FIG. 6B is a schematic diagram illustrating a client management table. In the storage 4000, a client management DB 4002 is constructed by a client management table. The client management table is configured to manage a client name and a password in association with a client ID (identifier, identification), for every client ID.

The chat application is a client application for exchanging messages between multiple users. The log application is a client application for the terminal 10 to request the management system 50 to publish (pub) the log of the terminal 10 as a message. The log application is a client application for requesting the management system 50 to subscribe (sub) the log of the terminal 10 as a message. The log management application is a client application that makes a sub request to the management system 50, and the log management application is also a server application that receives a log management request from the log application. The monitoring camera application is a client application for the terminal 10 to request the management system 50 to publish (pub) image data of a captured image as a message. The monitoring center camera application is a client application for requesting the management system 50 to subscribe (sub) image data of a captured image as a message. The monitoring center application is a client application that makes a sub request to the management system 50, and the monitoring center application is also a server application that receives a captured image management request from the monitoring application. In other words, each terminal 10 may request the management system 50 to transmit a message by using one or more applications. In addition, each terminal 10 may receive a message from the management system 50 by using one or more applications.

Service Management Table

FIG. 6C is a schematic diagram illustrating a service management table. In the storage 4000, a service management DB 4003 is constructed by a service management table. The service management table is configured to manage a service name in association with a service ID, for every service ID. In one embodiment, a service called a "transmission management system" identified by the service ID "S01" is the management system 50. Note that the access right to use or to have access to the Pub-sub function of the management system 50 indicates resources. Further, the pub-sub service using the management system 50 is a scope that is a unit of authorization in the protocol of OAuth 2.0. The management system 50 corresponds to a resource server.

Service Authorization Management Table

FIG. 6D is a schematic diagram illustrating a service authorization management table. In the storage 4000, a service authorization management DB 4004 is constructed by a service authorization management table. The service authorization management table is configured to manage a service ID in association with a client ID, for every client ID. As a result, the service authorization management table may manage which client has access to and is enabled to use which service. According to the service authorization management table illustrated in FIG. 6D, the chat application identified by the client ID "C01" has access to and is enabled to use the transmission management system identified by the service ID "S01", that is, the management system 50.

Each Functional Configuration of Authentication Server

The transmitter-receiver 41 is implemented by instructions from the CPU 501 and by the network I/F 509. The transmitter-receiver 41 is configured to transmit and receive various data (or information) with respect to a counterpart terminal, apparatuses, system, or the like via the communication network 2.

The user authentication unit 42 is implemented by instructions from the CPU 501 and is configured to perform user authentication in response to a request from the client.

The client authentication unit 43 is implemented by instructions from the CPU 501 and is configured to perform client authentication in response to a request from the client.

The authorization unit 44 is implemented by instructions from the CPU 501 and is configured to authorize a client to have access to a service by designating the access right of the client to the service.

The token issuing unit 45 is implemented by instructions from the CPU 501, and is configured to issue the authorization token used in the service upon the client accessing the service.

The storage-reader 49 is implemented by instructions from the CPU 501 and by the HDD 505, or by instructions from the CPU 501 alone, and is configured to store various data in the storage 4000 and extract various data stored in the storage 4000.

Functional Configuration of Management System

The management system 50 includes a transmitter-receiver 51, a token checker 52, a pub processor 53, a sub processor 54, and a storage-reader 59. These elements are functions that may be achieved by any of the above elements illustrated in FIG. 3 to operate instructions from the CPU 501 in accordance with the management system 50 program loaded from the HD 504 in the RAM 503. Further, the management system 50 has a storage 5000 composed of the HD 504.

Topic Management Table

FIG. 7A is a schematic diagram illustrating a topic management table. In the storage 5000, a topic management DB 5001 is constructed by a topic management table. The topic management table is configured to manage a topic name in association with a topic ID, for every topic ID. A topic is an attribute associated with a message. When the pub side (publisher) client application publishes a message with respect to the topic, the management system 50 transmits the message to the sub side (subscriber) client application.

Session Management Table

FIG. 7B is a schematic diagram illustrating a session management table. In the storage 5000, a session management DB 5004 is constructed by a session management table. As will be described later, the terminal 10 logs in by transmitting an authorization token including a user name to the management system 50. The terminal 10 makes a sub request with respect to the topic using the session established by logging in. The session management table is configured to manage the user name of the logged-in user in association with the topic ID of the topic sub requested by this user.

Each Functional Configuration of Management System

Next, a detailed description is given of a functional configuration of the management system 50. Note that in the following, an illustration is also given of a relationship between the components illustrated in FIG. 3 and with main components for implementing the respective functions of the management server 50.

The transmitter-receiver 51 is implemented by instructions from the CPU 501 and by the network I/F 509. The transmitter-receiver 51 is configured to transmit and receive various data (or information) with respect to each terminal, apparatus, or system via the communication network 2.

The token checker 52 checks the authorization token included in the login request of the terminal 10, which is implemented by instructions from the CPU 501.

The pub processor 53 is implemented by instructions from the CPU 501 and is configured to receive a pub request made by the client.

The sub processor 54 is implemented by instructions from the CPU 501 and is configured to receive a sub request made by the client.

The storage-reader 59 is implemented by instructions from the CPU 501 and by the HDD 505, or by instructions from the CPU 501 alone, and is configured to store various data in the storage 5000 and extract various data stored in the storage 5000.

Process or Operation of Embodiment

Figure 8:
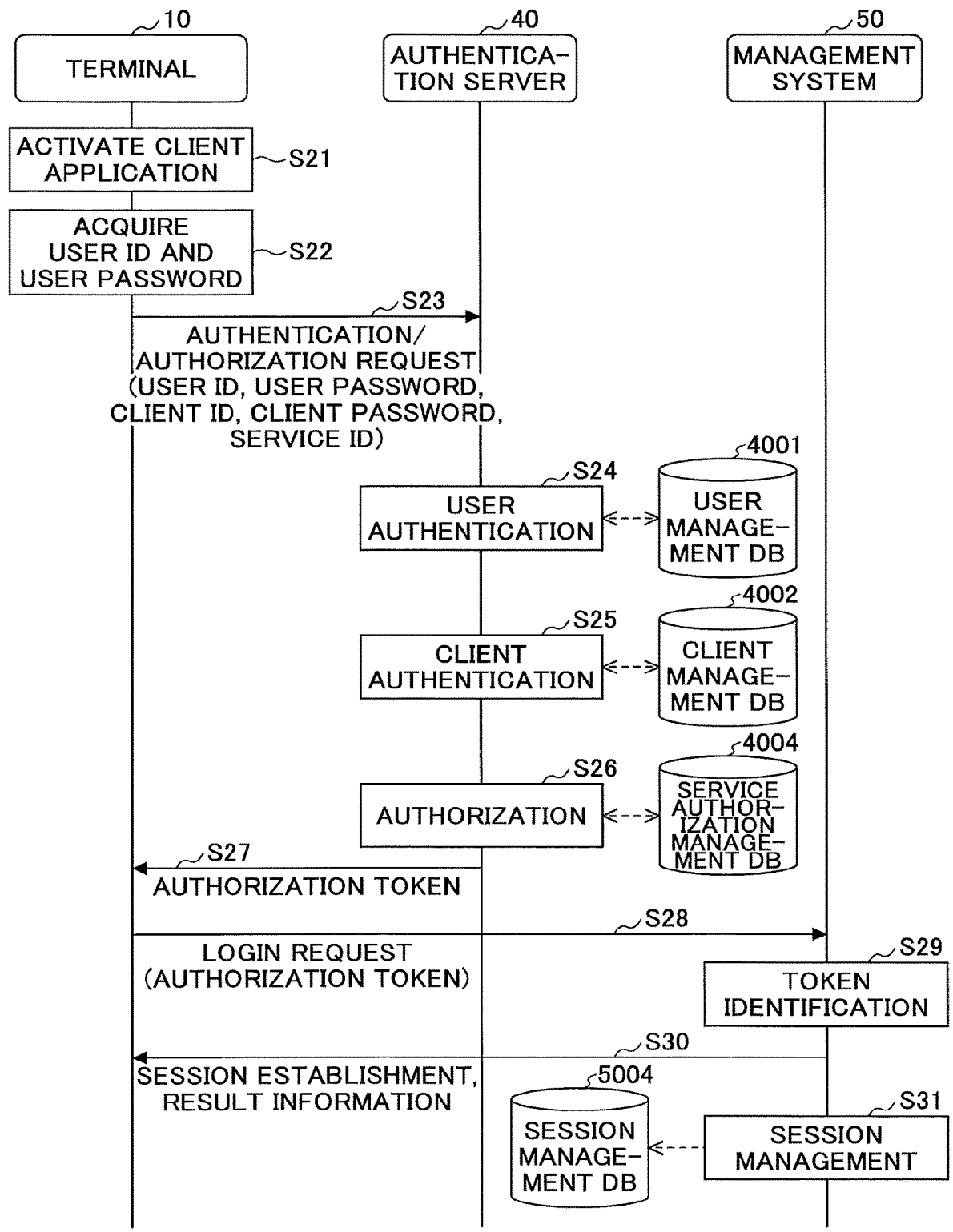
FIG. 8 is a sequence diagram illustrating an authentication process according to an embodiment.

The following illustrates processes or operations of the terminal 10, the authentication server 40, and the management system 50 constituting the communication system 1 of the present embodiment. First, an authentication process in one embodiment will be described with reference to FIG. 8. FIG. 8 is a sequence diagram illustrating a licensing process according to an embodiment.

When a desired client application installed on the terminal 10 is activated (step S21), the following process is started by each functional unit corresponding to the activated client application. The client application of the terminal 10 acquires a user ID and a user password of a user (step S22). The method for acquiring a user ID and a user password is not particularly specified; however, a user ID and a user password may be acquired by a method in which the operation input receiver 12 receives a user ID and a password input by a user, a method in which the storage-reader 19 reads a user ID and a password stored in advance in the storage 1000, and the like.

The authentication request unit 14 of the terminal 10 transmits an authentication/authorization request to the authentication server 40 via the transmitter-receiver 11 (step S23). This authentication/authorization request includes a user authentication request, a client authentication request, and a service access authorization request. The authentication request transmitted to the authentication server 40 includes a user ID and a user password acquired by the terminal 10, a client ID and a client password of the activated client, and a service ID as a scope indicating a service to be accessed in the future. The client ID and the client password are stored in advance in the storage 1000 and may be read by the storage-reader 19. The following illustrates a case where the service ID included in the authentication request is "S01" indicating the management system 50.

The transmitter-receiver 41 of the authentication server 40 receives an authentication request from the terminal 10. The user authentication unit 42 of the authentication server 40 performs user authentication based on whether a combination of a user ID and a user password included in the authentication request is managed in the user management table (see FIG. 6A) (step S24). In a case where a combination of a user ID and a user password included in the authentication request is managed in the user management table, the user authentication unit 42 succeeds in user authentication; in a case where a combination of a user ID and a user password included in the authentication request is not managed in the user management table, the user authentication unit 42 fails in the user authentication.

Further, the client authentication unit 43 of the authentication server 40 performs client authentication based on whether a combination of a client ID and a client password included in the authentication request is managed in the client management table (see FIG. 6B) (step S25). In a case where a combination of a client ID and a client password included in the authentication request is managed in the client management table, the client authentication unit 43 succeeds in client authentication; in a case where a combination of a client ID and a client password included in the authentication request is not managed in the client management table, the client authentication unit 43 fails in the client authentication.

In addition, the authorization unit 44 of the authentication server 40 authorizes an access to the service based on whether a combination of a client ID and a service ID included in the authentication request is managed in the service authorization management table (see FIG. 6D) (step S26). In a case where a combination of a combination of a client ID and a service ID included in the authentication request is managed in the service authorization management table, the authorization unit 44 succeeds in authentication; in a case where a combination of a client ID and a service ID included in the authentication request is not managed in the service authorization management table, the authorization unit 44 fails in authentication. For example, in a case where the chat application used by the user "a" requests use of the management system 50, the terminal 10 transmits an authentication request including the user ID "U01", the client ID "C01", and the service ID "S01" to the authentication server 40. In this case, the combination of the client ID "C01" and the service ID "S01" included in the authentication request is managed in the service authorization management table, and the authorization unit 44 thus succeeds in authentication.

In a case where at least one of the user authentication, the client authentication and the service authorization fails, the transmitter-receiver 41 transmits an error message indicating authentication failure or authorization failure to the terminal 10.

In a case where all of the user authentication, the client authentication and the service authorization succeeds, the token issuing unit 45 of the authentication server 40 issues an authorization token indicating that the terminal 10 requesting authentication is accessible to the management system 50 (step S27). The authorization token includes a user name, a client name, a service name using the authorization token, validation period of the token, and the like.

In the communication system 1, authentication and authorization may also be performed using protocols such as OAuth 2.0 and OpenID Connect. In such a case, the method of transmitting/receiving authentication information such as user ID/user password and contents included in the authorization token will be defined by the specification such as OAuth 2.0 and OpenID Connect. In that case, the token itself may be JWT (JSON Web Token). In order to ensure that the authorization token is not tampered with on that route, the token issuing unit 45 may sign the authorization token using a secret key. The secret key may use RSA (Rivest, Shamir, Adleman) encryption. Note that a signature may use a public key such as Hash-based Message Authentication Code (HMAC). The management system 50 using the authorization token identifies a signature using a public key or a shared key, depending on whether the authorization token is signed with the secret key or signed with the shared key. The signature may use a known standard such as JWS (JSON Web Signature). The authorization token is encrypted by JWE (JSON Web Encryption), for example, as necessary.

The transmitter-receiver 41 includes the issued authorization token in the authentication result and transmits the authorization token with the authentication result to the terminal 10. The transmitter-receiver 11 of the terminal 10 receives the authentication result including the authorization token transmitted by the authentication server 40. Subsequently, the transmitter-receiver 11 of the terminal 10 transmits a login request to the management system 50 by transmitting the received authorization token to the management system 50 (step S28).

The transmitter-receiver 51 of the management system 50 receives the login request transmitted by the terminal 10. The token checker 52 of the management system 50 checks the authorization token included in the login request (step S29). In this case, the token checker 52 analyzes the authorization token included in the login request according to the standard used in the communication system 1. The token checker 52 may determine whether the signature by the authentication server is correct, depending on the result of the analysis. In a case where the token checker 52 determines that the signature by the authentication server is not correct, the token checker 52 determines that the authorization token included in the login request has been tampered with, and fails the authorization.

Subsequently, the token checker 52 determines whether the validation period of the authorization token has expired by checking the validation period included in the authorization token. In a case where the token checker 52 determines that the validation period of the authorization token has expired, the token checker 52 fails the authorization due to expiration of the authorization token.

Subsequently, the token checker 52 checks whether the service name corresponding to the management system 50 is included in the authorization token. In a case where the token checker 52 determines that the service name corresponding to the management system 50 is not included in the authorization token, the token checker 52 fails the authorization.

In a case where the token checker 52 fails authorization during checking any one of the signature of the authorization token, the expiration period, and the service, the transmitter-receiver 51 transmits the authorization result information indicating that the authorization has failed to the terminal 10. In a case where the token checker 52 determines that all of the signature of the authorization token, the expiration date, and the service are valid, the token checker 52 authorizes the use of the service by the user and the client indicated in the authorization token. When the user and the client are authorized, the management system 50 establishes a session with the terminal 10 (step S30). In this case, the management system 50 transmits authorization result information indicating that the authorization has succeeded to the terminal 10.

When the session is established, the storage-reader 59 of the management system 50 records the user name included in the authorization token in the session management table (step S31). Further, the management system 50 may manage the user name included in the authorization token, the client name of the client, an IP address of the client and the like in association with one another in the storage 1000. As a result, even when the user name and the client name are not transmitted to the management system 50 every time a counterpart client transmits information, the management system 50 is enabled to identify the user name and the client name of the transmission source client.

The processes in steps S21 to S31 are executed for each of the client applications activated on the terminal 10. For example, each of the client applications such as the chat application and the log management application may make an authentication request to the authentication server 40 using a common user ID and user password. In a case where the management system 50 succeeds in authentication with respect to each of the client applications, separate sessions may be simultaneously established between the management system 50 and the respective client applications.

Figure 9:
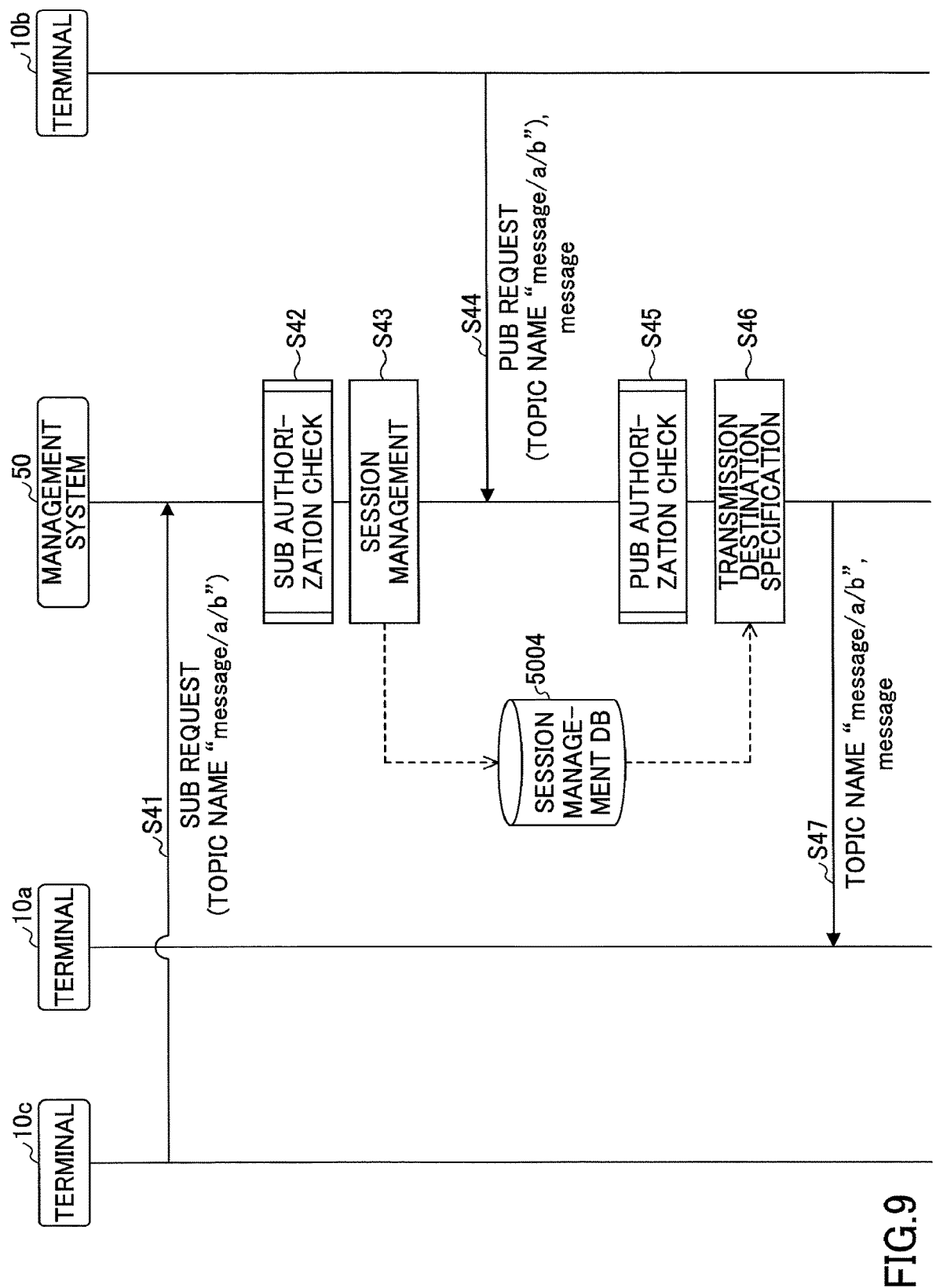
FIG. 9 is a sequence diagram illustrating an example of a process of publishing and subscribing a message.

Subsequently, a pub and sub process of a message performed between the terminals 10 will be described with reference to FIG. 9. FIG. 9 is a sequence diagram illustrating an example of a pub and sub process of a message. A terminal 10a as an example of the terminal 10 is authenticated with a user ID "U01" of a user "a" and a client ID "C01" of a client "chat application", and logs in to the management system 50 as a service. A terminal 10b as an example of the terminal 10 is authenticated with a user ID "U02" of a user "b" and a client ID "C01" of a client "chat application", and logs in to the management system 50 as a service. A terminal 10c as an example of the terminal 10 is authenticated with a user ID "U03" of a user "c" and a client ID "C01" of a client "chat application", and logs in to the management system 50 as a service.

Initially, the following describes a process where the terminal 10c used by the user c transmits a sub request to the management system 50 for a message to be transmitted from the user b to the user a, as an example of a process of rejecting the sub request made by spoofing. In order to receive a message transmitted from the user b to the user a, the sub request unit 16 of the terminal 10c transmits a sub request (reception request) to the management system 50 (step S41).

In the protocol of the service used by the chat application, a format of a specific topic name is defined for a message addressed to a specific user, i.e., for a message for direct messaging. The expression (1) indicates an example of a topic name in a format for direct messaging corresponding to a message transmitted from the user b to the user a.

$$message/a/b \qquad (1)$$

The topic name for direct messaging as indicated in expression (1) includes a first layer "message" indicating a topic for direct messaging, a second layer "a" indicating a destination user, and a third layer "b" indicating a transmission source user. The sub request transmitted from the terminal 10c to the terminal 10a in step S41 includes the topic name represented by the expression (1) as a topic name to be a sub target.

Figure 10:
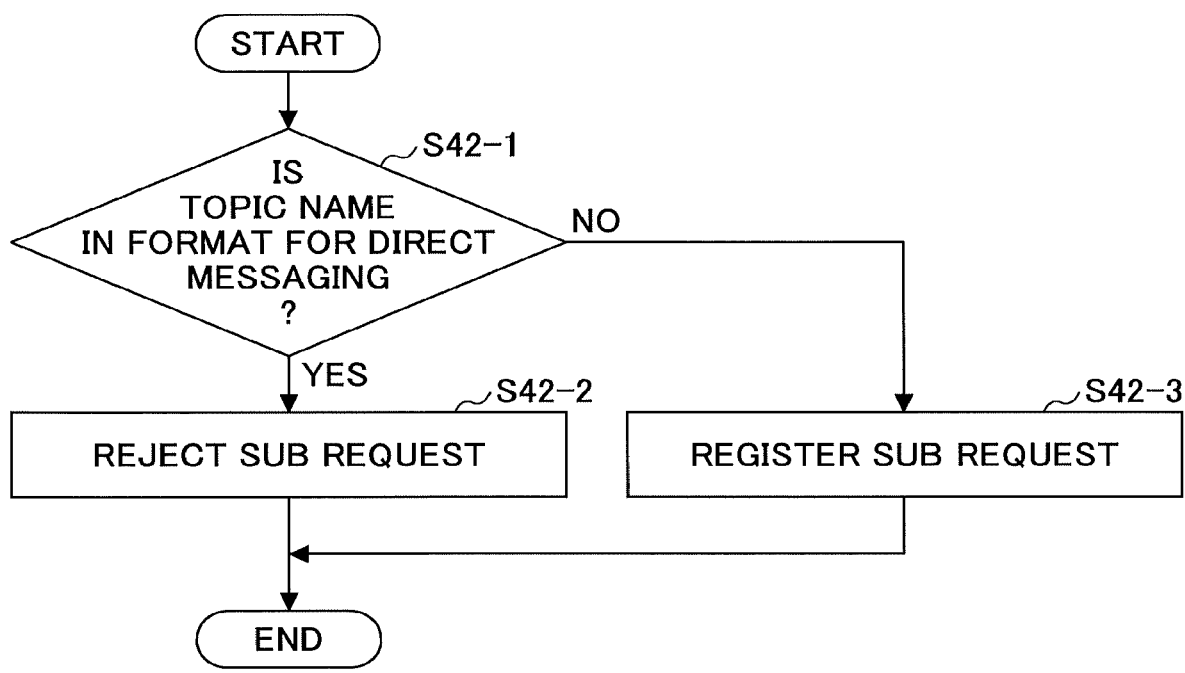
FIG. 10 is a flowchart depicting an example of a process of determining whether a terminal has authorization to subscribe a message.

The transmitter-receiver 51 of the management system 50 receives a sub request transmitted by the chat application of the terminal 10c. The sub processor 54 of the management system 50 determines whether the chat application of the terminal 10c has authorization to sub (receive) a message of a topic relating to the sub request (step S42). In the present embodiment, regarding direct messaging, it is assumed that subscription is performed without a sub request; hence, the following illustrates a case where the sub request made for the message for direct messaging is unconditionally rejected. The process of step S42 will be described in detail with reference to FIG. 10. FIG. 10 is a flowchart depicting an example of a process of determining whether a terminal has authorization to subscribe (sub) a message.

Initially, the sub processor 54 determines whether the topic name included in the sub request is in a format for direct messaging (step S42-1). When "message" is included in the first layer of the topic name, the sub processor 54 determines that the topic name included in the sub request is in the format for direct messaging; when "message" is not included in the first layer of the topic name, the sub processor 54 determines that the topic name included in the sub request is not in the format for direct messaging.

When the sub processor 54 determines that the topic name included in the sub request is in the format for direct messaging (YES in step S42-1), the sub processor 54 determines to reject the sub request (step S42-2). In this case, the transmitter-receiver 51 of the management system 50 may transmit information for rejecting the sub request to the sub request source terminal 10c; or the transmitter-receiver 51 of the management system 50 may end the process without transmitting information for rejecting the sub request to the sub request source terminal 10c. Further, the transmitter-receiver 51 of the management system 50 may determine the sub request transmitted by the terminal 10c to be a malicious one and may log out the terminal 10c.

When the sub processor 54 determines that the topic name included in the sub request is not in the format for direct messaging (NO in step S42-1), the sub processor 54 determines to register the sub request (step S42-3). In this case, the sub processor 54 searches the topic management table using the topic name included in the sub request as a search key, and acquires the corresponding topic ID. The sub processor 54 subsequently registers the acquired topic ID in the session management table in association with the user name "c" included in the authorization token transmitted to the management system 50 when the terminal 10c logs in first (step S43).

As a modification of the embodiment, in a case where the destination for the direct messaging is not the sub request source, the sub processor 54 may, upon receiving the sub request relating to the direct messaging, reject the sub request. In this case, when the second layer of the topic name included in the sub request is the user name "c" of the user c, the sub processor 54 registers the sub request; when the second layer is not the user name "c" of the user c, the sub processor 54 rejects the sub request.

Next, the following illustrates a process where the terminal 10b used by the user b transmits a pub request (transmission request) with respect to the topic. When the operation input receiver 12 of the terminal 10b receives an input of a message "Hello" addressed to the user a, the pub request unit 15 uses a session established with the management system 50 to transmit a pub request to the management system 50 (step S44). The pub request transmitted from the terminal 10b to the management system 50 includes the topic name "message/a/b" in the format for direct messaging and the message "Hello". When transmitting a pub request having a topic without designated destination, the transmitter-receiver 11 of the terminal 10b transmits a topic name that is not in the format for direct messaging to the management system 50.

Figure 11:
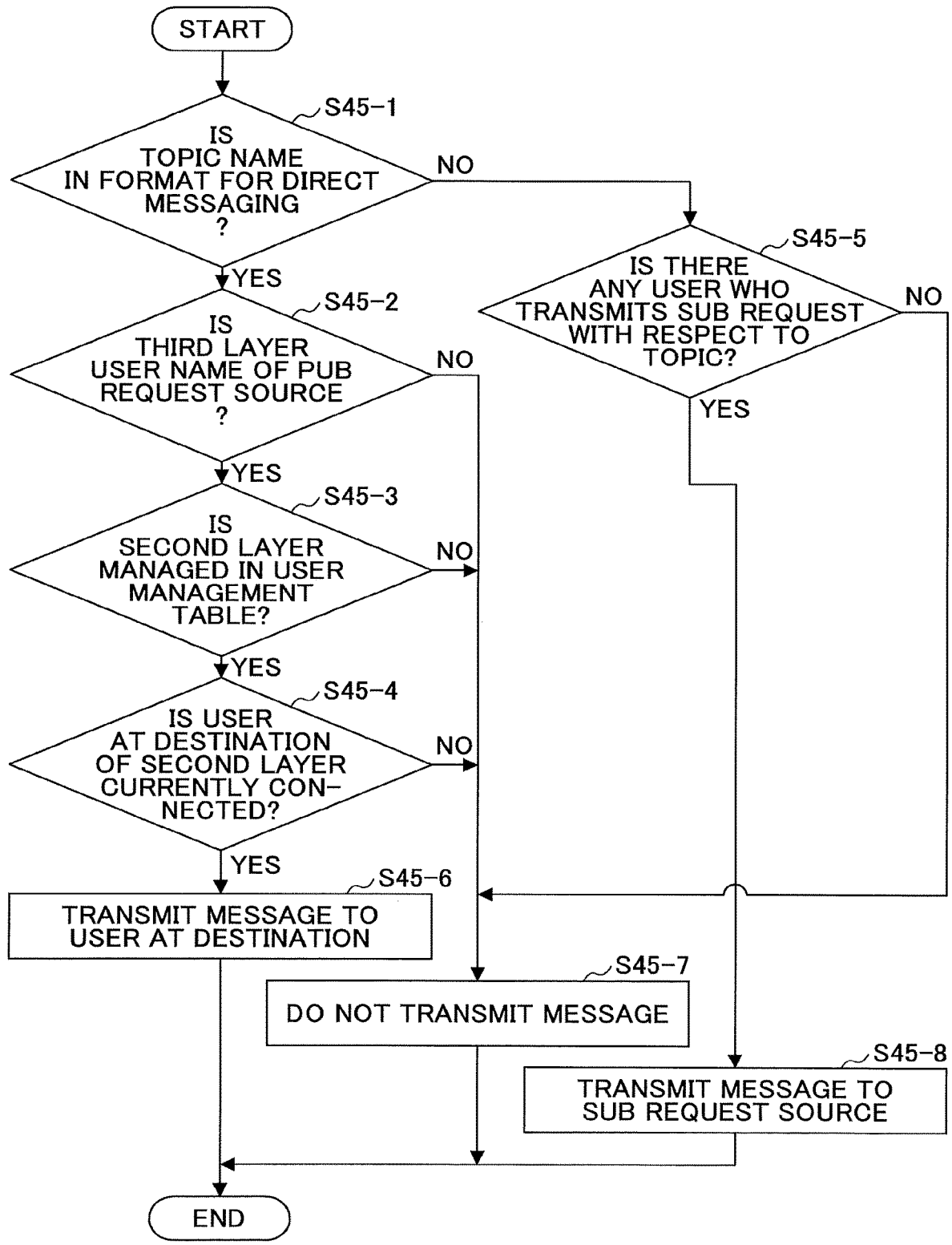
FIG. 11 is a flowchart depicting an example of a process of determining whether a terminal has authorization to publish a message.

The transmitter-receiver 51 of the management system 50 receives a pub request transmitted by the chat application of the terminal 10b. The pub processor 53 of the management system 50 determines whether the chat application of the terminal 10b has authorization to pub (transmit) a message of a topic relating to the pub request (step S45). The process of step S45 will be described in detail with reference to FIG. 11. FIG. 11 is a flowchart depicting an example of a process of determining whether a terminal has authorization to publish (pub) a message.

Initially, the pub processor 53 determines whether the topic name included in the pub request is in a format for direct messaging (step S45-1). When "message" is included in the first layer of the topic name, the pub processor 53 determines that the topic name included in the pub request is in the format for direct messaging; when "message" is not included in the first layer of the topic name, the pub processor 53 determines that the topic name included in the pub request is not in the format for direct messaging.

When the pub processor 53 determines that the topic name included in the pub request is in the format for direct messaging (YES in step S45-1), the pub processor 53 determines whether the third layer "b" in the topic name included in the pub request matches the user name of the pub request source (step S45-2). Note that the third layer is information indicating the transmission source of the message. The user name of the pub request source is included in the authorization token transmitted when the terminal 10b has first logged in to the management system 50. When the pub processor 53 determines that the third layer "b" in the topic name included in the pub request does not match the user name of the pub request source (NO in step S45-2), the pub processor 53 determines not to transmit the message relating to the pub request to the destination (step S45-7). This enables the pub processor 53 to reject a pub request made by spoofing. In this case, the transmitter-receiver 51 of the management system 50 may transmit information for rejecting the pub request to the pub request source terminal 10b; or the transmitter-receiver 51 of the management system 50 may end the process without transmitting information for rejecting the pub request to the pub request source terminal 10b.

When the pub processor 53 determines that the third layer "b" in the topic name included in the pub request matches the user name of the pub request source (YES in step S45-2), the pub processor 53 determines whether the second layer "a" in the topic name included in the pub request is managed in the user management table (step S45-3). Note that the second layer is information indicating the destination of the message. A method for checking whether the second layer is managed in the user management table is not particularly specified; however, a method for making an inquiry to the authentication server 40 as to whether the second layer "a" is managed in the user management table, a method for constructing a DB synchronized with the user management DB 4001 of the authentication server 40 in the storage 5000, or the like may be given as examples. When the pub processor 53 determines that the second layer "a" is not managed in the user management table (NO in step S45-3), the pub processor 53 determines not to transmit the message relating to the pub request to the destination (step S45-7). In this case, the transmitter-receiver 51 of the management system 50 may transmit information for rejecting the pub request to the pub request source terminal 10*b*; or the transmitter-receiver 51 of the management system 50 may end the process without transmitting information for rejecting the pub request to the pub request source terminal 10*b*.

When the pub processor 53 determines that the second layer "a" is managed in the user management table (YES in step S45-3), the pub processor 53 determines whether the user indicated by the second layer logs into the service to be currently connected (step S45-4). In step S45-4, the pub processor 53 refers to the session management table and determines that the connection is currently in progress when the second layer "a" in the topic name included in the pub request is recorded as the user name, and determines that the connection is not currently in progress when the second layer "a" in the topic name included in the pub request is not recorded as the user name. When the pub processor 53 determines that the user indicated by the second layer is not currently connected (NO in step S45-4), the pub processor 53 determines not to transmit the message relating to the pub request to the destination (step S45-7). In this case, the transmitter-receiver 51 of the management system 50 may transmit information for rejecting the pub request to the pub request source terminal 10*b*; or the transmitter-receiver 51 of the management system 50 may end the process without transmitting information for rejecting the pub request to the pub request source terminal 10*b*.

When the pub processor 53 determines that the user indicated by the second layer is currently connected (YES in step S45-4), the pub processor 53 determines to transmit the message relating to the pub request to the destination indicated by the second layer "a" (step S45-6). Since a user name "a" is included in the authorization token transmitted when the terminal 10*a* has first logged in to the management system 50, the transmitter-receiver 51 of the management system 50 is enabled to specify the terminal 10*a* as the destination of the message (step S46). The transmitter-receiver 51 of the management system 50 transmits the topic name "message/a/b" and the message "Hello" included in the pub request by the terminal 10*b* to the terminal 10*a* (step S47).

The transmitter-receiver 11 of the terminal 10*a* receives the topic name and the message transmitted by the management system 50. The terminal 10*a* is enabled to specify the user "b" as a transmission source of the message by the third layer "b" of the received topic.

When the pub processor 53 determines that the topic name included in the pub request is not in the format for direct messaging in step S45-1 (NO in step S45-1), the pub processor 53 determines whether there is a user who has transmitted a sub request with respect to the topic relating to the pub request (step S45-5). Specifically, the pub processor 53 searches the topic management table using the topic name included in the pub request as a search key, and acquires the corresponding topic ID. Further, the pub processor 53 searches the session management table using the acquired topic ID as a search key. Note that when the pub processor 53 acquires a corresponding user name, the pub processor 53 determines that there is a user who has made a sub request with respect to the topic relating to the pub request. When the pub processor 53 does not acquire a corresponding user name, the pub processor 53 determines that there is no user who has made a sub request with respect to the topic relating to the pub request. When the pub processor 53 determines that there is no user who has made a sub request with respect to the topic relating to the pub request (NO in step S45-5), the pub processor 53 determines not to transmit a message relating to the pub request (step S45-7). In this case, the transmitter-receiver 51 of the management system 50 may transmit information for rejecting the pub request to the pub request source terminal 10*b*; or the transmitter-receiver 51 of the management system 50 may end the process without transmitting information for rejecting the pub request to the pub request source terminal 10*b*.

When the pub processor 53 determines that there is a user who has made a sub request with respect to the topic relating to the pub request (YES in step S45-5), the pub processor 53 determines to transmit a message of the topic relating to the pub request to the sub request source that has made a sub request with respect to the topic (step S45-8). The transmitter-receiver 51 of the management system 50 specifies the terminal 10 that has transmitted the authorization token including the user name of the sub request source acquired from the session management table in step S45-5 as the transmission destination of the message (step S46). In this case, the transmitter-receiver 51 of the management system 50 transmits the topic name and the message included in the pub request to the specified terminal 10. The transmitter-receiver 11 of the sub request source terminal 10 thus receives the topic name and the message transmitted by the management system 50.

Main Advantageous Effects of Embodiment

Subsequently, main effects of the above embodiment will be described. According to the communication control method of the above embodiment, the management system 50 (an example of a control system) controls transmission of a message (an example of content data) between the terminals 10. Note that the message is content data such as text, image data, video data, or sound data that may be published (pub) or subscribed (sub) in the pub-sub model. The transmitter-receiver 51 (an example of a receiver) of the management system 50 receives (an example of a reception process) a pub request (an example of a transmission request for transmitting a message) including a topic name of a message (an example of attribute information indicating an attribute) transmitted by a terminal 10*b* (an example of a first communication terminal). Note that the topic is a predetermined attribute in the pub-sub model in order to specify subscribing information. In a case where the topic name is in a format for direct messaging (an example of a predetermined format) including the second layer (an example of destination information) indicating the destination of the message, the pub processor 53 (an example of a controller) of the management system 50 performs control for transmitting a message to the terminal 10*a* (an example of a second communication terminal) specified based on the second layer included in the topic name. In a case where the topic name is not in a format for direct messaging, the pub processor 53 of the management system 50 performs control for transmitting a message to a terminal 10 (an example of a third communication terminal) that has made a sub request (an example of a reception request) of a message of a topic indicated by a topic name (an example of a control process). Thus, when a pub request is made with respect to a topic in a format for direct messaging, the message is transmitted to a specific destination based on the second layer of the topic name, thereby improving security.

The transmitter-receiver 51 of the management system 50 receives the sub request (an example of the reception request of the content data) including the topic name that is transmitted by the terminal 10. The sub processor 54 (an example of the controller) of the management system 50 rejects the sub request when the topic name is in the format for direct messaging. This will prevent the message in the format for direct messaging from being sub (subscribed/received) based on the sub request.

The topic name in the format for direct messaging includes a third layer (an example of transmission source information) indicating the transmission source of the message. As a result, the terminal 10a that has received the message is enabled to specify the transmission source of the message based on the third layer of the topic name.

Based on the user ID "U02" (an example of the first account information) included in the authentication request request transmitted by the terminal 10b, the user authentication unit 42 (an example of the authentication unit) of the authentication server 40 (an example of a control system) authenticates the terminal 10b. Note that the account is authorization to use or have access to services, etc., and the communication system 1 uses the user ID as an account. In a case where the topic name is in the format for direct messaging, and the third layer "b" corresponding to the above-described user ID "U02" is included in the topic name, the pub processor 53 performs control for transmitting a message to the terminal 10a. In a case where the third layer "b" corresponding to the above-described user ID "U02" is not included in the topic name, the pub processor 53 performs control for not transmitting the content data to the terminal 10a. This will prevent spoofing by the pub request source.

When the terminal 10a is authenticated based on the user ID "U01" corresponding to the second layer "a" and logged in, the pub processor 53 performs control for transmitting a message in the format for direct messaging to the terminal 10a; when the terminal 10a is not authenticated by the account information corresponding to the second layer "a", the pub processor 53 performs control for not transmitting a message in the format for direct messaging to the terminal 10a. This will improve security for message transmission.

In a case where the destination of the message is specified, the terminal 10 transmits a pub request including the topic name in the format for direct messaging to the management system 50; in a case where the destination of the message is not specified, the terminal 10 transmits a pub request including a topic name that is not in the format for direct messaging to the management system 50 (an example of transmission processing). As a result, the terminal 10 is enabled to make a pub request with a specified destination or to make a pub request without a specified destination by a similar process except that the topic name is different.

Supplementary Explanation of Embodiment

Each of the programs for the terminal 10, the authentication server 40, and management system 50 is stored in a computer-readable recording medium (a recording medium 106 etc.) in an installable form or in an executable form to be ready for distribution. Other examples of the recording medium may include a compact disc recordable (CD-R), a digital versatile disk (DVD), and a Blu-ray Disc.

The above-described recording media that store the above-described programs such as a CD-ROM, and the HDs 504 that store these programs may be provided domestically or internationally as a program product.

Further, the terminal 10, the authentication server 40, and the management system 50 in the above-described embodiments may be constructed by a single computer, or may be constructed by multiple computers separately assigned to the desired components (functions or means). Further, the authentication server 40 and the management system 50 may be constructed by a single computer.

The control system according to the above-described embodiment may be achieved by a device memory storing one or more programs and one or more processors. One or more processors perform the processes described in the embodiments by executing one or more programs. For example, the device memory and one or more processors may achieve (implement) the functions as described in the embodiments. For example, the device memory and one or more processors may be achieved (implemented) by hardware components as described in the embodiments.

As described above, the present invention may provide an advantageous effect of improving security in processing content data with respect to a specific destination in the pub-sub model system.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits. A processing circuit includes a programmed processor. A processing circuit also includes devices such as an application specific integrated circuit (ASIC) and conventional circuit components arranged to perform the recited functions.

The processing circuitry is implemented as at least a portion of a microprocessor. The processing circuitry may be implemented using one or more circuits, one or more microprocessors, microcontrollers, application specific integrated circuits, dedicated hardware, digital signal processors, microcomputers, central processing units, field programmable gate arrays, programmable logic devices, state machines, super computers, or any combination thereof. Also, the processing circuitry may include one or more software modules executable within one or more processing circuits. The processing circuitry may further include memory configured to store instructions and/or code that causes the processing circuitry to execute functions.

If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 101 in a computer system or other system. The machine code may be converted from the source code, etc. If embodied in hardware, each block may represent a circuit or a number of interconnected circuits to implement the specified logical function(s).

Although the present invention has been described based on the embodiments, the present invention is not limited to the above-described embodiments, and various modifications may be made within the scope described in the claims.

What is claimed is:

1. A control system configured to control transmission of content data between communication terminals, the control system comprising:
   processing circuitry configured to
      receive a transmission request for transmitting the content data from a first communication terminal, the transmission request including a topic name,
      determine whether the received topic name is in a predetermined format by determining whether the topic name has a predetermined value,
      in response to determining that the topic name is in the predetermined format, transmit the content data to a second communication terminal specified in destination information included in a portion of the topic name having the predetermined format, the destination information indicating a destination of the content data, and
      in response to determining that the topic name is not in the predetermined format, transmit the content data to a third communication terminal that has previously requested reception of the content data.

2. The control system according to claim 1, wherein the processing circuitry is further configured to
   receive, from the third communication terminal, a reception request, including the topic name, for receiving the content data, and
   reject the reception request in response to the topic name being in the predetermined format.

3. The control system according to claim 1, wherein the processing circuitry is further configured to
   determine whether the topic name is in the predetermined format by further determining whether transmission source information indicating a transmission source of the content data is included in a particular portion of the topic name.

4. The control system according to claim 3, wherein the processing circuitry is further configured to authenticate the first communication terminal based on first account information transmitted by the first communication terminal,
   wherein when the topic name is determined to be in the predetermined format, the processing circuitry is further configured to
   transmit the content data to the second communication terminal in response to the transmission source information corresponding to the first account information being included in the topic name, and
   not transmit the content data to the second communication terminal in response to the transmission source information corresponding to the first account information not being included in the topic name.

5. The control system according to claim 3, wherein the processing circuitry is further configured to
   transmit the content data to the second communication terminal in response to the second communication terminal being authenticated based on account information corresponding to the destination information, and
   not transmit the content data to the second communication terminal in response to the second communication terminal not being authenticated based on the account information corresponding to the destination information.

6. The control system according to claim 1, further comprise the first communication terminal, which is configured to
   transmit the transmission request, which includes the topic name in the predetermined format to the control system in response to the destination of the content data being specified, and
   transmit the transmission request, which includes topic name not in the predetermined format to the control system in response to the destination of the content data not being specified.

7. The control system of claim 1, wherein the processing circuitry is further configured to determine whether the topic name is in the predetermined format, which is a format for direct messaging.

8. The control system of claim 1, wherein the processing circuitry is further configured to determine whether or not a particular portion of the topic name has the predetermined value, which indicates that the content data is for direct messaging.

9. A computer-implemented communication control method performed by a control system configured to control transmission of content data between communication terminals, the communication control method comprising:
   receiving a transmission request for transmitting the content data from a first communication terminal, the transmission request including a topic name;
   determining whether the received topic name is in a predetermined format by determining whether the topic name has a predetermined value;
   in response to determining that the topic name is in the predetermined format, transmitting the content data to a second communication terminal specified in destination information included in a portion of the topic name having the predetermined format, the destination information indicating a destination of the content data; and
   in response to determining that the topic name is not in the predetermined format, transmitting the content data to a third communication terminal that has previously requested reception of the content data.

10. The computer-implemented communication control method according to claim 9, wherein the step of transmitting the content data includes
    transmitting, by the first communication terminal, the transmission request, which includes the topic name in the predetermined format, to the control system in response to the destination of the content data being specified, and
    transmitting, by the first communication terminal, the transmission request, which includes the topic name not in the predetermined format, to the control system in response to the destination of the content data not being specified.

11. A computer program product comprising a non-transitory computer-readable medium including a computer-readable program, wherein the computer-readable program, when executed on a control system configured to control transmission of content data between communication terminals, causes the control system to:
    receive a transmission request for transmitting the content data from a first communication terminal, the transmission request including a topic name;
    determine whether the received topic name is in a predetermined format by determining whether the topic name has a predetermined value;
    in response to determining that the topic name is in the predetermined format, transmit the content data to a second communication terminal specified in destination information included in a portion of the topic name having the predetermined format, the destination information indicating a destination of the content data; and in response to determining that the topic name is not in the predetermined format, transmit the content data to a third communication terminal that has previously requested reception of the content data.

* * * * *